July 29, 1941.  N. F. ADAMSON ET AL  2,250,883

CLUTCH

Original Filed May 10, 1939

Inventors:
Nicholas F. Adamson and
Kay L. Bastrup
By Davis, Lindsey, Smith & Shonts
Attys.

Patented July 29, 1941

2,250,883

UNITED STATES PATENT OFFICE 2,250,883

CLUTCH

Nicholas F. Adamson and Kay L. Bastrup, Racine, Wis., assignors to Twin Disc Clutch Company, Racine, Wis., a corporation of Wisconsin Original application May 10, 1939, Serial No. 272,768. Divided and this application May 1, 1940, Serial No. 332,770

3 Claims. (Cl. 192—68)

Our invention relates to clutches and more particularly to that type in which engagement is effected by a mechanical actuation of the component elements in contrast to spring loading.

The principal object of our invention is to devise a clutch of the over-center type which is maintained in an engaged or disengaged position by the action of centrifugal force on the operating mechanism.

This application is a division of our copending application for Clutch, Serial No. 272,768, filed May 10, 1939.

These and further objects of our invention will be set forth in the following specification, reference being had to the accompanying drawing, and the novel means by which said objects are effectuated will be definitely pointed out in the claims.

Figure 1:
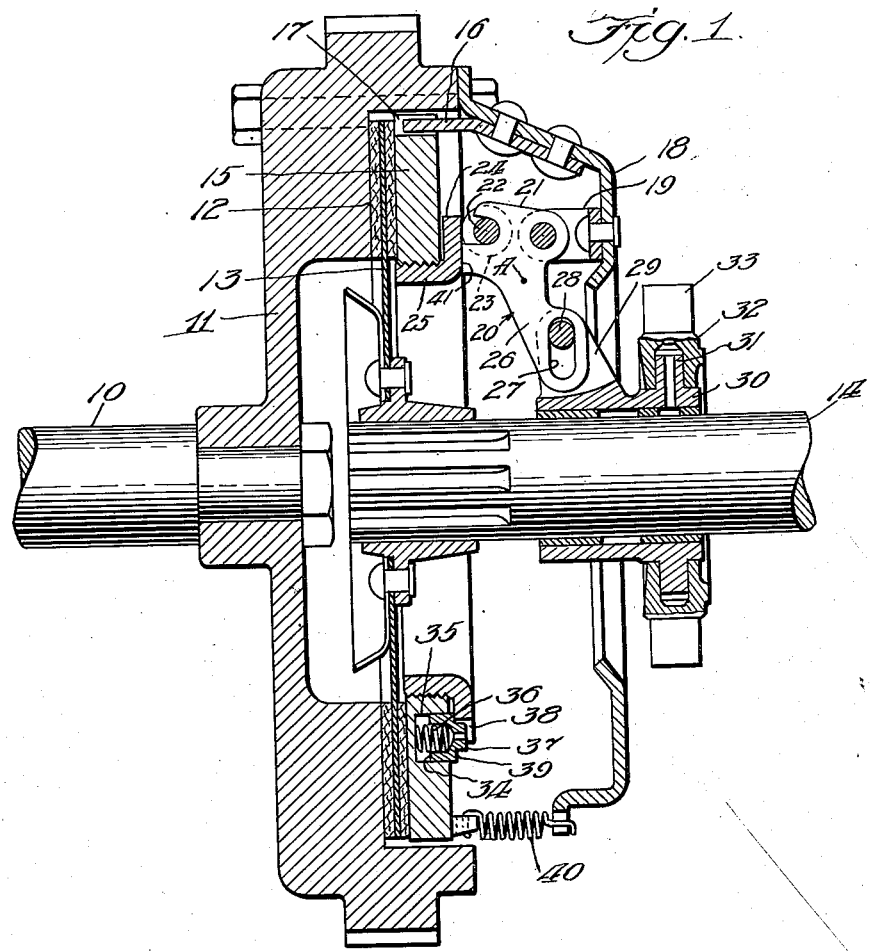
Figure 1 is a sectional elevation of the clutch in engaged position.

Referring to the drawing, the numeral 10 designates a driving shaft having mounted thereon a flywheel 11 which is counterbored to provide an operating face 12. The flywheel functions as the member of the clutch that is held against axial movement and the face 12 engages an annulus of friction material secured to the adjacent side of a driven plate 13 that is splinedly connected to a driven shaft 14 so that the plate 13 rotates therewith, but is capable of axial movement relative thereto. It will be understood that the terms "driving" and "driven," as applied to the shafts 10 and 14, respectively, are merely illustrative, since the direction of drive may be reversed without affecting the clutch construction hereinafter described.

The friction annulus on the opposite side of the plate 13 is engaged by the adjacent side of the pressure plate 15 which is drivably connected to the flywheel by means of a plurality of circumferentially spaced tongues 16, one end of each tongue being received within a slot 17 set inwardly from the periphery of the plate 15 and the opposite end being secured to a cover plate 18 that is fixed to the flywheel and slightly offset therefrom to provide a housing for the operating mechanism.

This mechanism may take the form of a number of lever devices equispaced around the clutch, as disclosed in the above-noted application, and one of such devices is shown in Fig. 1. A U-shaped bracket 19 is secured to the cover plate 18 and pivotally mounted between the limbs of this bracket is a lever 20 having an arm 21 which extends toward the pressure plate 15. The free end of the arm 21 is bifurcated to receive the reduced central portion 22 of a dual roller 23 which rides along and abuts an annular flange 24 formed on an adjusting ring 25 that is threaded internally of the pressure plate 13.

The other lever arm 26 extends inwardly toward the driven shaft 14, when the parts are occupying the position illustrated in Fig. 1, and includes an elongated slot 27 within which operates a pin 28 that is mounted on an arm 29. This arm forms part of an actuating sleeve 30 that is slidable along the shaft 14 and which incorporates an annular flange 31 embraced by an operating collar 32 having a pair of trunnions 33 for engagement by the usual shifting fork (not shown).

The ring 25 provides a medium for adjusting the clutch as the facings on the plate 13 wear, and as required by the fact that the levers 20 are characterized by a constant throw. The adjusted position of the ring 25 is maintained by a plunger 34 that is slidably mounted in a pocket 35 provided in the pressure plate 15. The plunger is hollow and is normally urged toward the right, as viewed in Fig. 1, by a helical spring 36, one end of which abuts the base of the pocket and the other the plunger. The latter is provided with a reduced head 37 which is received within an arcuate notch 38 provided in the periphery of the adjusting ring flange 24, it being understood that a number of such notches are provided around the ring, preferably in equispaced relation. A shoulder 39 is formed on the plunger 34 and normally contacts the inner surface of the flange 24 to limit outward movement of the plunger under the impulse of the spring 36. A plurality of release springs 40 connect the pressure and cover plates 15 and 18, respectively, and these springs are under constant tension when the clutch is engaged, so that when the levers 20 are moved to a released position, the springs 40 assist in retracting the plate 15 and maintain contact of this plate with the roller 23.

As already noted, Fig. 1 shows the clutch in an engaged position and, in this relation of parts, the radial distance of the pintle 22 from the axis of the shaft 14 is greater than the similar distance of the pivot of the lever 20 from the same axis, or in other words, the lever 20 has been moved to an over-center position and is thus effectively locked against disengagement.

This locking is assisted by the retracting pull of the release springs 40 and also by the fact that since the center of gravity A of the lever 20 is located to the left of the lever pivot, as viewed in Fig. 1, centrifugal force also acts to maintain the lever in engaged position. Each lever is provided with a nose 41 which contacts the flange 24 to prevent further rotation of the associated lever in a clockwise direction.

Figure 2:
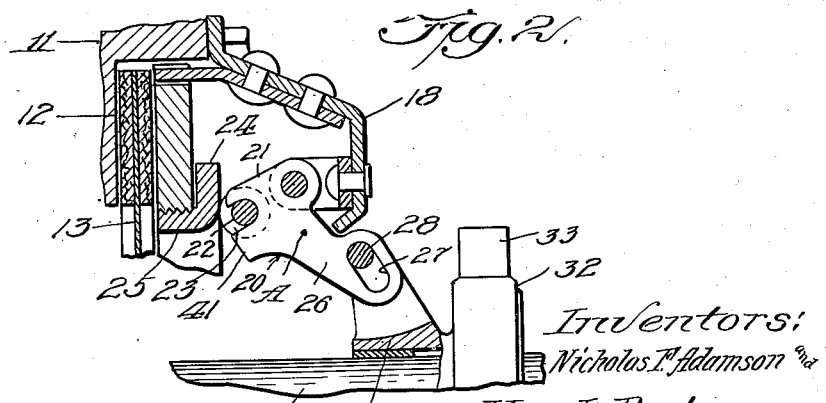
Fig. 2 is a fragmentary, sectional elevation of the clutch when disengaged as viewed in Fig. 1.

To release the clutch, it is merely necessary to move the actuating sleeve 30 toward the right, as viewed in Fig. 1, whereupon the lever 20 will be rocked in a counterclockwise direction to the position illustrated in Fig. 2. In the released position, the center of gravity of each lever 20 is located to the right of the lever pivot, as viewed in Fig. 2, so that centrifugal force acts to hold the lever in this position.

When the clutch is engaged, the lever 20 is moved in a clockwise direction by shifting the sleeve 30 toward the left and the ensuing axial movement of the pressure plate 15 to clamping position is effected by pressure of the roller 23 against the flange 24, the lever fulcruming on the bracket 19.

As the clutch facings wear, adjustment of the clutch is easily secured by depressing the plunger 34 sufficient to free the adjusting ring 25 for rotation, whereupon this ring can be withdrawn toward the right, as viewed in Fig. 1, to maintain the desired contact with the roller 23. This adjustment does not require any special tool.

Our improved clutch construction is such that it may be easily mounted upon a flywheel, or other rotary part, and with the major portion of its operating mechanism substantially housed within the cover plate 15 so that it is characterized by a high safety factor. Furthermore, since centrifugal force operates to maintain the lever 20 in either engagement or disengagement, no special provision is required to hold the lever in either of the indicated positions, although, so long as the release springs 40 are operative, these springs assist in the indicated actions.

We claim:

1. The combination of a rotary member having a cover plate, a pressure plate drivably connected to the cover plate and axially shiftable to grip a driven plate against the member, an L-shaped lever pivoted on the cover plate, one arm extending generally toward the pressure plate and the other toward the clutch axis when the clutch is engaged, and means engageable with said last-named arm for rocking the lever on the cover plate as a fulcrum to cause the first-named arm to move the pressure plate to driving position and for retracting the lever to permit the pressure plate to move to released position, the lever arms being so proportioned and arranged relative to each other and to the lever pivot that the center of gravity of the lever shifts from one side to another of the radius through the lever pivot as the clutch is engaged and disengaged whereby centrifugal force acts to maintain the lever in either position.

2. In a clutch, the combination of a pair of clutch devices, a pressure plate connected to one of the devices and shiftable to drivably connect both devices, and lever means mounted on one of the devices and having a portion for engaging the plate, the lever means being operative in one direction against said one device as a fulcrum to move the plate to driving position and in the opposite direction to permit the plate to move to release position, the lever means being so proportioned and arranged relative to the pivot thereof that the center of gravity of the lever means shifts from one side to another of the radius through the lever means pivot as the clutch is engaged and disengaged whereby centrifugal force acts to maintain the lever means in either position.

3. Actuating mechanism for a clutch in which a pair of clutch elements are engaged by a pressure plate comprising lever means mounted on one of the elements and having a portion for engaging the plate, the lever means being operative in one direction against said one element as a fulcrum to move the plate to driving position and in the opposite direction to permit the plate to move to release position, the lever means being so proportioned and arranged relative to the pivot thereof that the center of gravity of the lever means shifts from one side to another of the radius through the lever means pivot as the clutch is engaged and disengaged whereby centrifugal force acts to maintain the lever means in either position.

NICHOLAS F. ADAMSON.
KAY L. BASTRUP.